United States Patent
Skjellnes

(10) Patent No.: US 9,184,654 B2
(45) Date of Patent: Nov. 10, 2015

(54) ASSEMBLY FOR CONVERTING AN INPUT AC VOLTAGE TO AN OUTPUT AC VOLTAGE

(75) Inventor: Asle Einar Skjellnes, Ranheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 248 days.

(21) Appl. No.: 13/978,708

(22) PCT Filed: Dec. 2, 2011

(86) PCT No.: PCT/EP2011/071593
§ 371 (c)(1),
(2), (4) Date: Jul. 8, 2013

(87) PCT Pub. No.: WO2012/093009
PCT Pub. Date: Jul. 12, 2012

(65) Prior Publication Data
US 2013/0279215 A1    Oct. 24, 2013

(30) Foreign Application Priority Data

Jan. 7, 2011  (EP) .................................... 11150376

(51) Int. Cl.
*H02M 1/36* (2007.01)
*H02M 1/32* (2007.01)
(Continued)

(52) U.S. Cl.
CPC *H02M 1/36* (2013.01); *H02M 1/32* (2013.01); *H02M 1/4225* (2013.01); *H02M 1/4233* (2013.01); *H02M 5/45* (2013.01);
(Continued)

(58) Field of Classification Search
CPC .................................................. H02M 5/4505
USPC ................................ 363/34, 37, 50, 65, 85, 88
See application file for complete search history.

(56) References Cited

U.S. PATENT DOCUMENTS 4,122,515 A  10/1978  Tachibana et al. ............... 363/45
6,055,167 A   4/2000  Shamkovich et al. .......... 363/52
(Continued)

FOREIGN PATENT DOCUMENTS

| DE | 2601263 A1 | 7/1976 | .............. H01F 27/34 |
| JP | 4138063 A | 5/1992 | .............. H02M 7/155 |
| JP | 2004072846 A | 3/2004 | .............. H02M 7/12 |
| WO | 2012/093009 A2 | 7/2012 | .............. H02M 1/42 |

OTHER PUBLICATIONS

International Search Report and Written Opinion, Application No. PCT/EP2011/071593, 12 pages, Aug. 14, 2012.

*Primary Examiner* — Jeffrey Sterrett
(74) *Attorney, Agent, or Firm* — Slayden Grubert Beard PLLC

(57) ABSTRACT

An assembly for converting an assembly input AC voltage to an assembly output AC voltage may include: plural converters, each including a rectifier stage for rectifying an input AC voltage to a DC voltage, the rectifier including: first and second input terminals between which the input AC voltage is applied; first and second thyristors connected in series, wherein the first input terminal is connected between the first and second thyristors; first and second diodes connected in series, wherein the second input terminal is connected between the first and second diodes; and first and second output terminals between which the DC voltage is achieved, wherein the first thyristor and the first diode are connected to the first output terminal, and the second thyristor and the second diode are at least indirectly connected to the second output terminal.

20 Claims, 4 Drawing Sheets

(51) Int. Cl.
*H02M 1/42* (2007.01)
*H02M 5/45* (2006.01)
*H02M 7/162* (2006.01)
*H02M 1/00* (2007.01)

(52) U.S. Cl.
CPC ......... *H02M 5/4505* (2013.01); *H02M 7/1626* (2013.01); *H02M 2001/0077* (2013.01); *Y02B 70/126* (2013.01)

(56) References Cited

U.S. PATENT DOCUMENTS

| | | | |
|---|---|---|---|
| 6,075,717 A * | 6/2000 | Kumar et al. | 363/87 |
| 7,313,008 B2 * | 12/2007 | Steimer | 363/98 |
| 8,553,432 B2 * | 10/2013 | Komulainen et al. | 363/35 |
| 2003/0043603 A1 | 3/2003 | Schreiber | 363/37 |
| 2013/0279215 A1 * | 10/2013 | Skjellnes | 363/37 |

* cited by examiner

US 9,184,654 B2

ASSEMBLY FOR CONVERTING AN INPUT AC VOLTAGE TO AN OUTPUT AC VOLTAGE

CROSS-REFERENCE TO RELATED APPLICATIONS

This application is a U.S. National Stage Application of International Application No. PCT/EP2011/071593 filed Dec. 2, 2011, which designates the United States of America, and claims priority to EP Patent Application No. 11150376.9 filed Jan. 7, 2011. The contents of which are hereby incorporated by reference in their entirety.

TECHNICAL FIELD

The present disclosure relates to an assembly comprising a plurality of converters, each converter being for converting an input AC voltage to an output AC voltage, each converter comprising a rectifier stage. In particular, the converter is adapted for changing a frequency and/or a voltage of the input AC voltage to be supplied to a load requiring a variable frequency power signal such as a synchronous motor.

BACKGROUND

From US 2003/0043603 A1 a frequency converter is known, wherein an energy flow from a three-phase network is fed from secondary windings of a transformer with one or more cells per output phase. For each output phase, each identical cell has a diode input rectifier circuit, an active harmonic filter, an intermediate circuit capacitance and a three-point DC/AC converter on the output side.

Document JP 04138063 A discloses a bridge type rectifier circuit RC composed by bridge-connecting thyristors as controlled rectifiers and diodes.

Document JP 2004072846 A discloses a rectifying device, wherein a plurality of serial connection circuits are connected in parallel which include a switching arm composed of an inverse parallel connection circuit of a switching element and a diode, a serial connection circuit in which a diode is connected in series to any one of the switching elements having an inverse conduction function, and a serial connection circuit in which two diodes are connected in series.

Document U.S. Pat. No. 6,055,167 discloses a boost converter, wherein an input sinusoidal AC voltage source is input to an EMI filter and surge suppressor, wherein an output of the EMI filter is fed to input bridge rectifier consisting of two power rectifiers and two SCR's, which are gated by a phase control circuit, wherein by controlling the firing angle of the SCRs with respect to zero crossover point, the output voltage (DC OUT) is controlled.

Document U.S. Pat. No. 4,122,515 discloses a power converter with a plurality of rectifier circuits, in which two sets of rectifier circuits are employed, wherein a rectifier circuit system is comprised of a bridge circuit including a pair of thyristors and diodes, and another bridge circuit including thyristors and diodes. Thereby, the DC sides of the bridge circuits is connected in series.

Document DE 26 01 263 discloses a power converter for converting a AC voltage to a DC voltage having plural rectifier circuits.

However, the operation of the conventional frequency converter is difficult, in particular during starting up of the converter. Further, when a single cell in the frequency converter comprising several cells fails, energy supply to the load may be completely interrupted. Thereby, many disadvantages may occur, in particular for a subsea operation of a device, such as for example a pump or other equipment driven by a motor.

There may be a need for a rectifier stage for rectifying an input AC voltage to a DC voltage, a need for a converter for converting an input AC voltage to an output AC voltage and a need for an assembly of converters for converting an assembly input AC voltage to an assembly output AC voltage, wherein the above-mentioned problems are at least partially overcome or at least reduced.

SUMMARY

One embodiment provides an assembly for converting an assembly input AC voltage to an assembly output AC voltage, the assembly comprising: a primary wire winding to which the assembly input AC voltage is applied; a plurality of converters each for converting an input AC voltage to an output AC voltage, each of the plurality of converters comprising: a rectifier stage, wherein the input AC voltage is applied between a first input terminal and a second input terminal of the rectifier stage; a capacitor connected between a first output terminal and a second output terminal of the rectifier stage; and a converter stage arranged for converting a DC voltage between the first output terminal and the second output terminal of the rectifier stage to the output AC voltage between converter output terminals; wherein each rectifier stage is for rectifying the input AC voltage to the DC voltage, each rectifier stage comprising: the first input terminal and the second input terminal between which the input AC voltage is applied; a first thyristor; a second thyristor connected in series with the first thyristor, wherein the first input terminal is connected between the first thyristor and the second thyristor; a first diode; a second diode connected in series with the first diode, wherein the second input terminal is connected between the first diode and the second diode; and the first output terminal and the second output terminal between which the DC voltage is achieved, wherein the first thyristor and the first diode are connected to the first output terminal and the second thyristor and the second diode are at least indirectly connected to the second output terminal, wherein each converter of the plurality of converters has a secondary wire winding connected to the first input terminal of the rectifier stage in the converter and the second input terminal of the rectifier stage in the converter, wherein each secondary wire winding is inductively coupled to the primary wire winding, wherein the converter output terminals of the plurality of converters are connected in series to achieve the assembly output AC voltage, and wherein, in case of a failure, isolation of a converter is enabled using the thyristors of the rectifier stage in the converter.

In a further embodiment, each rectifier stage further comprises a first switchable element connected between the second thyristor and the first output terminal.

In a further embodiment, each rectifier stage further comprises a second switchable element connected in series with the first switchable element, the series connected first switchable element and second switchable element being connected between the first output terminal and the second output terminal, wherein the second input terminal is connected between the first switchable element and the second switchable element.

In a further embodiment, in each rectifier stage, the first diode is connected in parallel to the first switchable element and the second diode is connected in parallel to the second switchable element.

In a further embodiment, each rectifier stage further comprises a third diode via which the second thyristor and the second diode are indirectly connected to the second output terminal.

In a further embodiment, each rectifier stage further comprises an inductor via which the second thyristor and the second diode are indirectly connected to the second output terminal.

In a further embodiment, in each rectifier stage, the first switchable element is connected to the second thyristor via the inductor.

In a further embodiment, each rectifier stage further comprises a thyristor control circuit for controlling a conduction state of at least one of the first thyristor and the second thyristor.

In a further embodiment, in each rectifier stage, the first input terminal and the second input terminal are adapted to be connected to a secondary wire winding which is inductively coupleable to a primary wire winding.

In a further embodiment, each rectifier stage comprises a thyristor control circuit for controlling a conduction state of at least one of the first thyristor and the second thyristor, wherein the thyristor control circuit is configured to perform at least one of the following control functions: controlling a charging of the capacitor during starting up the converter, and controlling a shutting off the converter in response to the failure.

BRIEF DESCRIPTION OF THE DRAWINGS

Example embodiments of the present invention are described in detail below with reference to the accompanying drawings, in which.

DETAILED DESCRIPTION

Figure 1:
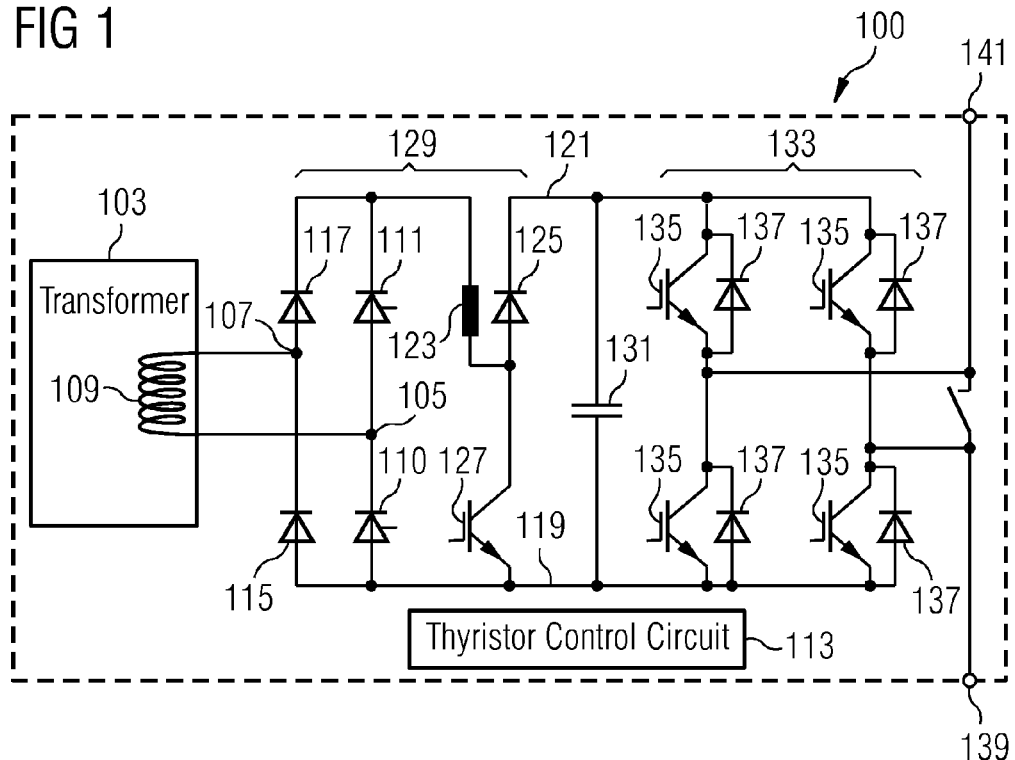
FIG. 1 schematically illustrates a circuit diagram of a converter connected to a secondary wire winding according to an embodiment.

According to an embodiment an assembly for converting an assembly input AC voltage to an assembly output AC voltage is provided, wherein the assembly comprises a primary wire winding to which the assembly input AC voltage is applied (wherein the primary wire winding may comprise two or three connections to which the assembly input AC voltage may be applied); a plurality of converters as explained below, wherein each converter of the plurality of converters has a secondary wire winding connected to the first input terminal of the converter and the second input terminal of the converter, wherein each secondary wire winding is inductively coupled to the primary wire winding (such that a current flow through the primary wire winding causes a magnetic field and causes a magnetic flux through the secondary wire winding resulting in a voltage between the first input terminal and the second input terminal of each converter), wherein the converter output terminals (at which the respective output AC voltages of the converters are provided) of the plurality of converters are connected in series to achieve the assembly output AC voltage.

Each converter of the plurality of converters is for converting an input AC voltage to an output AC voltage, wherein the converter comprises a rectifier stage as explained below, wherein the input AC voltage is applied between the first input terminal and the second input terminal of the rectifier stage; a capacitor (in particular comprising one or more capacitor elements, each of which is adapted to store an electric charge) connected between the first output terminal and the second output terminal of the rectifier stage; and a converter stage arranged for converting the DC voltage between the first output terminal and the second output terminal of the rectifier stage to the output AC voltage between (in particular two) converter output terminals.

The rectifier stage in each converter is for rectifying (in particular converting alternating current (AC), which periodically reverses direction, to direct current (DC), current that flows in only one direction) an input AC voltage (i.e. an alternating voltage and/or alternating current periodically reverses direction, such as a variable frequency or constant frequency voltage and/or current signal or power signal or electric power stream or wave form, having in particular a voltage value between 200 V and 1000 V and having in particular a frequency between 25 Hz and 100 Hz) to a DC voltage (in particular a voltage or current may still periodically oscillate in amplitude but the current may flow only in one direction, the amplitude having a plus sign or a minus sign, in particular a voltage or current which is within a range between +/−50%, in particular +/−20%, of an average voltage or current, respectively). Thereby, the rectifier comprises a first input terminal and a second input terminal between which the input AC voltage is applied (the first input terminal and the second input terminal in particular comprise a conductive material and the first input terminal and the second input terminal may in particular comprise a plug or/and a socket); a first thyristor (or any general bi-stable switch which adopts a conducting state, when its gate receives a current pulse and which continues to conduct for as long as it is forward biased that is, as long as the voltage across the device has not reversed, wherein in particular the thyristor is a solid-state semiconductor device with four layers of alternating N and P-type material, a thyristor also being referred to as a silicon controlled rectifier); a second thyristor (which may be configured in a same or in a different way than the first thyristor) connected in series (the first thyristor having in particular a first terminal and a second terminal which may allow current flow in the conducting state of the first thyristor, the second thyristor having in particular a first terminal and a second terminal, wherein current flow is allowed between the first terminal and the second terminal of the second thyristor, when the second thyristor is in a conducting state, wherein the second terminal of the first thyristor is connected to the first terminal of the second thyristor); a first diode (in particular a semiconductor device allowing current flow in a particular forward direction, in particular the first diode having a first terminal and a second terminal); a second diode connected in series with the first diode (the second diode having in particular a first terminal and a second terminal, wherein current flow is enabled between the first terminal and the second terminal of the second diode, wherein the second terminal of the first diode is connected to the first terminal of the second diode); a first output terminal and a second output terminal of the rectifier stage between which the DC voltage is achieved (or generated when the rectifier stage is in operation), wherein the first thyristor and the first diode (in particular the first terminal of the first thyristor and the first terminal of the first diode) are connected (in particular directly) to the first output terminal and wherein the second thyristor and the second diode (in particular the second terminal of the second thyristor and the second terminal of the second diode) are at least indirectly (allowing that one or more other elements are connected in between) connected to the second output terminal.

Thereby, in case of a failure, isolation of a converter in the assembly is enabled using the thyristors of the rectifier stage in the converter.

In particular, the terms "voltage signal", "current signal", "power signal", "electric power stream", "power stream" or "wave form" may be used to denote a physical (measurable or detectable) quantity adapted to transfer electric energy. The physical quantity may eventually be related to the Pointing vector or a propagation direction of an electromagnetic wave. The transfer may be in the direction of the Pointing vector and/or along a wire to which a current signal and/or voltage signal and/or power signal is applied.

The rectifier stage may in particular be applied for or used for rectifying a high power (such as 200 kW to 1000 kW) input AC voltage or current, such as an input AC voltage of between 200 V and 1500 V, in particular low voltage (being per IEC definition up to 1000 V AC, 1500 V DC). In particular, the electronic or electric elements comprised within the rectifier stage, such as the first thyristor, the second thyristor, the first diode, the second diode, may be semiconductor power components. In particular, the rectifier stage may be employed for supplying energy to a subsea equipment or oil platform equipment. Further, the rectifier stage may be employed for supplying energy to the DC-link in a multi-H-cell converter.

The first thyristor and the second thyristor comprised within the rectifier stage enable to control the operation of the rectifier stage in order to reduce or at least partially overcome some of the above-mentioned problems. In particular, the first thyristor and/or second thyristor may be controlled (in particular regarding their conducting state) using a thyristor control circuit. Thereby, the operation of the rectifier stage may be improved. The rectifier stage may be suitable for medium and higher voltage operation (medium voltage may be defined from 1000 V AC to 60 000 V AC). The rectifier stage has only two input terminals, namely the first input terminal and the second input terminal to which the input AC voltage is applied. In particular, the input AC voltage may be generated by inductive coupling of a coil of a secondary winding to a primary coil.

According to an embodiment the rectifier stage (in each converter in the assembly) further comprises a first switchable element (or reversible transistor or controllable switch or any other element which allows controlled switching of its conduction state) connected between the second thyristor and the first output terminal. In particular, the first switchable element may have a first terminal, such as a collector and a second terminal, such as an emitter, wherein the first terminal of the first switchable element is connected (at least indirectly) to the second terminal of the second thyristor and the emitter of the first switchable element is connected (in particular directly) to the first output terminal. Thereby, the rectifying process may be improved, in particular using the first switchable element as a step-up chopper.

According to an embodiment the rectifier stage (in each converter in the assembly) further comprises a second switchable element (or reversible transistor or controllable switch whose conduction state may be controlled by a signal applied at a control terminal) connected in series with the first reversible transistor (the second switchable element in particular having a first terminal, such as a collector and a second element, such as an emitter of the second switchable element, wherein the emitter of the second switchable element is connected (in particular directly) to the collector of the first switchable element), wherein the series connected first switchable element and second switchable element being connected between the first output terminal and the second output terminal (in particular the collector of the second switchable element may be connected to the second output terminal and the emitter of the first switchable element may be connected to the first output terminal), wherein the second input terminal is connected between the first switchable element and the second switchable element (in particular the second input terminal is connected to the emitter of the second switchable element and is also connected to the collector of the first switchable element).

According to an embodiment the first diode is connected in parallel to the first switchable element (in particular the first terminal of the first diode is connected to the second terminal of the first switchable element and the second terminal of the first diode is connected to the first terminal of the first switchable element) and the second diode is connected in parallel to the second switchable element (in particular the first terminal of the second diode is connected to the second terminal of the second switchable element and the second terminal of the second diode is connected to the first terminal of the second switchable element). Thereby, a rectification process may be improved.

Thus, in particular the rectifier stage may comprise, according to an embodiment, two switchable elements, namely the first switchable element and the second switchable element connected in series wherein the first diode is connected in parallel to the first switchable element and wherein the second diode is connected in parallel to the second switchable element.

According to another embodiment the rectifier stage comprises only the first switchable element but not the second switchable element but comprises further a third diode via which the second thyristor and the second diode are (in particular indirectly) connected to the second output terminal. In particular, the second terminal of the second diode and also the second terminal of the second thyristor are (in particular indirectly) connected to a first terminal of the third diode and a second terminal of the third diode is connected (in particular directly) to the second output terminal of the rectifier stage.

In particular additionally to the third diode the rectifier stage, according to an embodiment, further comprises an inductor (such as a coil having an impedance, wherein a resistance increases with increasing frequency) via which the second thyristor and the second diode are indirectly connected to the second output terminal. In particular, the second terminal of the second diode and also the second terminal of the second thyristor may be connected to a first terminal of the inductor and a second terminal of the inductor may be connected (in particular via the third diode) to the second output terminal. In particular, the inductor and the third diode may be connected in series between the second diode and the second thyristor on one hand and the second output terminal on the other hand.

According to an embodiment the first switchable element is connected to the second thyristor via the inductor. In particular, the collector of the first switchable element is connected to the second terminal of the inductor and the first terminal of the inductor may be connected to the second terminal of the second thyristor.

According to an embodiment the rectifier circuit or rectifier stage further comprises a thyristor control circuit for controlling a conduction state of at least one of the first thyristor and the second thyristor. Thereby, it is enabled to control the rectification process for rectifying the input AC voltage to the DC voltage between the first output terminal and the second output terminal. For example, the thyristor control circuit may be used during start-up of the rectifier stage or may be used to isolate the rectifier stage in case of a failure.

According to an embodiment the first input terminal and the second input terminal are adapted to be connected to a secondary wire winding (also referred to as secondary coil) which is inductively coupleable to a primary wire winding (also referred to as primary coil). The secondary wire winding in particular may comprise a coil which may be wound around a base structure such that in the secondary wire winding a voltage may be induced when a current flow is effected through the primary wire winding. In particular, current flow through the primary wire winding may cause generation of a magnetic field and the generated magnetic field may cause a magnetic flux through the secondary wire winding such that a voltage is induced between the first input terminal and the second input terminal. Depending on a number of windings of the secondary winding (in particular relative to a number of windings of the primary wire winding) a transformation of the input AC voltage to a higher or to a lower value may be achieved.

In particular, the rectifier stage is adapted for rectifying the input AC power signal (having a particular voltage and current) to an at least approximately DC power signal, the capacitor may be adapted to flatten the approximately DC power signal and the converter stage may receive the approximate DC power signal for conversion to the output AC voltage having a desired (fixed or variable) frequency. Thereby, transformation and conversion of a particular input AC voltage to an output AC voltage having a desired frequency and desired voltage amplitude is achieved. In particular, because of only one secondary wire winding is required for the converter, the converter may be constructed and manufactured in a simplified way with respect to a conventional converter. Further, due to the first thyristor and the second thyristor comprised within the rectifier stage controlling the converter is enabled for improving its operation.

According to an embodiment the rectifier stage comprised in the converter comprises a thyristor control circuit for controlling a conduction state of at least one of the first thyristor and the second thyristor, wherein the thyristor control circuit is adapted for controlling a charging of the capacitor, in particular during start-up of the converter, and/or controlling a shutting off the converter, in particular in case of the failure. Thereby, the operation of the converter may be improved.

Further, an arrangement of such assemblies for converting an assembly input AC voltage to an assembly output AC voltage may be constructed, wherein the arrangement comprises several assemblies (each comprising a chain of series connected converters), wherein the assemblies are connected in parallel such as to provide two, three, four or more phases of an arrangement output AC voltage having a desired amplitude (in particular transformation ratio with respect to an input voltage) and having a desired (fixed or variable) frequency. Thereby, in particular a load requiring high power may be supplied with electric energy, such as having a voltage between 3 kV and 10 kV.

In particular, each electric phase may be converted employing a string (chain) of cells (connected in series). In a three-phase system, the phases may be connected in a star or a delta configuration. In a multiphase system, the phases (chains) may be connected in a star configuration, polygon configuration or different combinations than these.

According to an embodiment a method of manufacturing an assembly comprising a plurality of converters is provided. The method comprises a method of manufacturing a converter for converting an input AC voltage to an output AC voltage which in turn comprises a method of manufacturing a rectifier stage for rectifying an input AC voltage to a DC voltage. The manufacturing method comprises steps for arranging the elements within the rectifier stage, the converter and the assembly such that the rectifier stage, the converter and the assembly, respectively, are constructed.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The illustration in the drawing is schematically. It is noted that in different figures, similar or identical elements are provided with the same reference signs or with reference signs, which are different from the corresponding reference signs only within the first digit.

FIG. 1 schematically illustrates a converter 100 according to an embodiment for converting an input AC voltage to an output AC voltage connected to a transformer 103. The converter 100 comprises a first input terminal 105 and a second input terminal 107 between which the input AC voltage is applied by inductively coupling of the secondary wire winding 109 to a primary wire winding (not illustrated). The first input terminal 105 is connected between a first thyristor 109 and a second thyristor 111. The first thyristor 109 and the second thyristor 111 are connected in series. The first thyristor 109 and the second thyristor 111 are controlled (via a signal line applied at their control gates) by a thyristor control circuit 113 (the signal lines are not indicated in FIGS. 1 and 2). The second input terminal 107 is connected between a first diode 115 and a second diode 117. The first diode 115 is connected in series with the second diode 117.

The first diode 115 and the first thyristor 109 are connected to a first output terminal 119, wherein in particular a first terminal of the first diode 115 and a first terminal of the first thyristor 109 are connected to the first output terminal 119. The second diode 117 and the second thyristor 111, in particular a second terminal of the second diode 117 and a second terminal of the second thyristor 111, are connected to a second output terminal 121 via an inductor 123 and a third diode 125. Thus, the second diode 117 and the second thyristor 111 are indirectly connected to the second output terminal 121.

The embodiment of the converter 100 illustrated in FIG. 1 further comprises a first switchable element 127, in this case embodied as an isolated gate bipolar transistor (IGBT) whose conduction state may be controlled using a control signal applied to a gate terminal. In particular, the second thyristor and the second diode are indirectly connected to the second output terminal 121 via the third diode 125 and via the inductor 123. In particular, the first switchable element 127, here an IGBT, is connected to the second thyristor 111 via the inductor 123.

When an input AC voltage is applied between the first input terminal 105 and the second input terminal 107 the converter 100 first rectifies the voltage using the rectifier stage 129 comprising the first diode 115, the second diode 117, the first thyristor 109, the second thyristor 111, the third diode 125, the inductor 123 and the switchable element 127. Thus, the voltage between the first output terminal 119 and the second output terminal 121 is at least approximately a DC voltage or current.

As a further stage the converter 100 illustrated in FIG. 1 comprises a capacitor 131 which further modifies the voltage between the first output terminal 119 and the second output terminal 121 to be at least approximately a direct current (DC) signal.

The approximate DC voltage or current at the first output terminal 119 and the second output terminal 121 is converted to an AC voltage or current signal having a predetermined or desired frequency and voltage amplitude by a converter stage 133. The converter stage 133 comprises between the output terminal 119 and 121 of the rectifier stage 129 four pairs of an IGBT 135 and a diode 137, wherein two pairs are connected in series and another two pairs are also connected in series between the output terminal 119 and the output terminal 121. Between the two of the series connected pairs a first output terminal 139 is connected and between the two other series connected pairs a second output terminal 141 of the converter is connected. By appropriately controlling the IGBTs 135 comprised within the converter stage 133 a voltage between the output terminals 139 and 141 may be generated, wherein this output voltage has a desired (fixed or variable) frequency. Further, by adapting in particular a number of windings of the secondary wire winding 109 the amplitude of the voltage at the output terminals 139 and 141 may be adjusted as desired, wherein the secondary winding voltage is chosen such as to fit the IGBT voltage rating.

A pulse width modulation (PWM) scheme for the inverter (DC to AC converter) may be a possible control strategy to be used in the inverter part for controlling the output frequency and output voltage of the (complete AC to AC) converter.

The thyristor control circuit 113 may in particular be adapted for controlling a charging of the capacitor 131, in particular during starting up the converter 100. Further or alternatively, the thyristor control circuit 113 may be adapted for controlling a shutting off of the converter 100, in particular in case of a failure of one or more elements comprised within the converter or the transformer 103.

Figure 2:
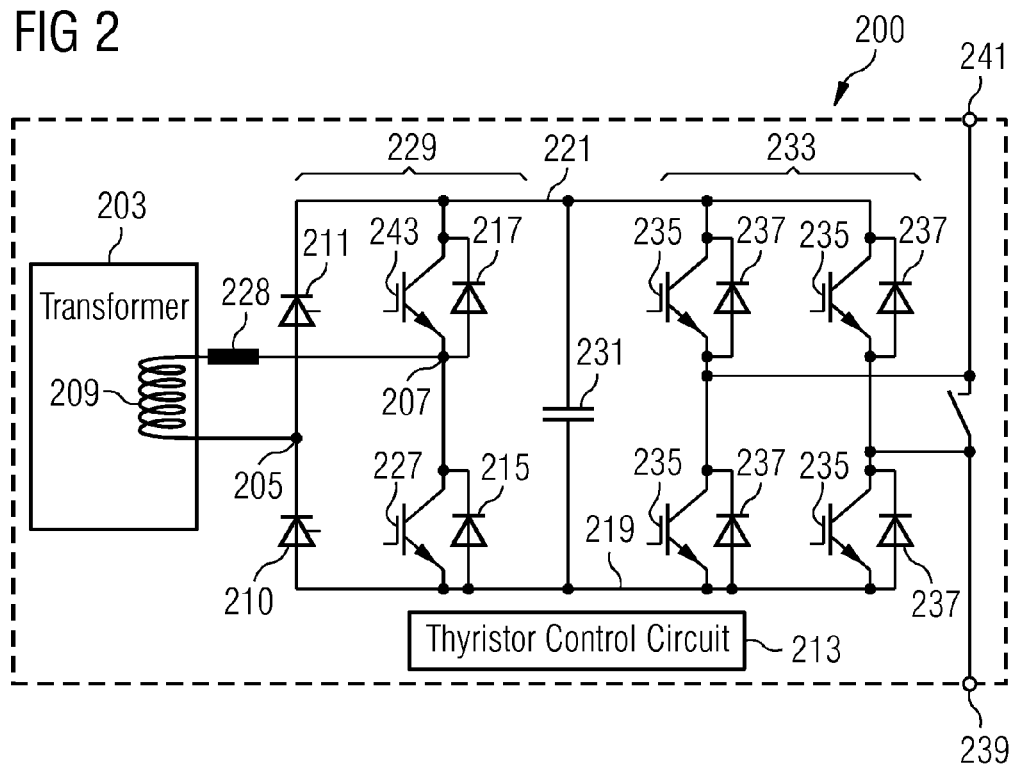
FIG. 2 schematically illustrates a circuit diagram of a converter connected to a secondary wire winding according to another embodiment.

FIG. 2 schematically illustrates a circuit diagram of a converter 200 according to an embodiment connected to a transformer 203. Some elements of the converter 200 have a similar or same configuration and arrangement as in the converter 100 illustrated in FIG. 1. Corresponding elements (corresponding in structure and/or function) in FIGS. 1 and 2 are denoted with reference signs differing only in the first digit. Whereas the capacitor stage 231 in FIG. 2 is similarly arranged as the capacitor stage 131 illustrated in FIG. 1 and whereas the converter stage 233 in FIG. 2 is similarly arranged as the converter stage 133 illustrated in FIG. 1, the rectifier stage 229 in FIG. 2 exhibits some differences relative to the rectifier stage 129 illustrated in FIG. 1.

The rectifier stage 229 comprises, as the rectifier stage 129 illustrated in FIG. 1, a first input terminal 205 which is connected between a first thyristor 209 and a second thyristor 211. Further, the rectifier stage 229 illustrated in FIG. 2 comprises, as the rectifier stage 129 illustrated in FIG. 1, a first diode 215 and a second diode 217, wherein a second input terminal 209 is connected between the first diode 215 and the second diode 217. Further, the first diode 215 is connected in series with the second diode 217 and the first thyristor 209 is connected in series with the second thyristor 211, as in the rectifier stage 129 illustrated in FIG. 1. Further, as the rectifier stage 129 illustrated in FIG. 1, the rectifier stage 229 illustrated in FIG. 2 comprises a first switchable element 227 connected between the second thyristor 211 and the first output terminal 219.

In contrast to the embodiment illustrated in FIG. 1 the rectifier stage 219 comprises a second switchable element (here embodied as an IGBT) 243 which is connected in series with the first switchable element 227, wherein the series connected first switchable element and the second switchable element being connected between the first output terminal 219 and the second output terminal 221, wherein the second input terminal 209 is connected between the first switchable element 227 and the second switchable element 243. Further, as illustrated in FIG. 2, the first diode 215 is connected in parallel to the first switchable element 227 and the second diode 217 is connected in parallel to the second switchable element 243. As in the embodiment of the rectifier stage 129 illustrated in FIG. 1, the first thyristor 209 and the second thyristor 211 are controlled (regarding their conduction state) using the thyristor control circuit 213 which provides control signals (not illustrated) to the gates of the first thyristor 209 and the second thyristor 211.

Figure 3:
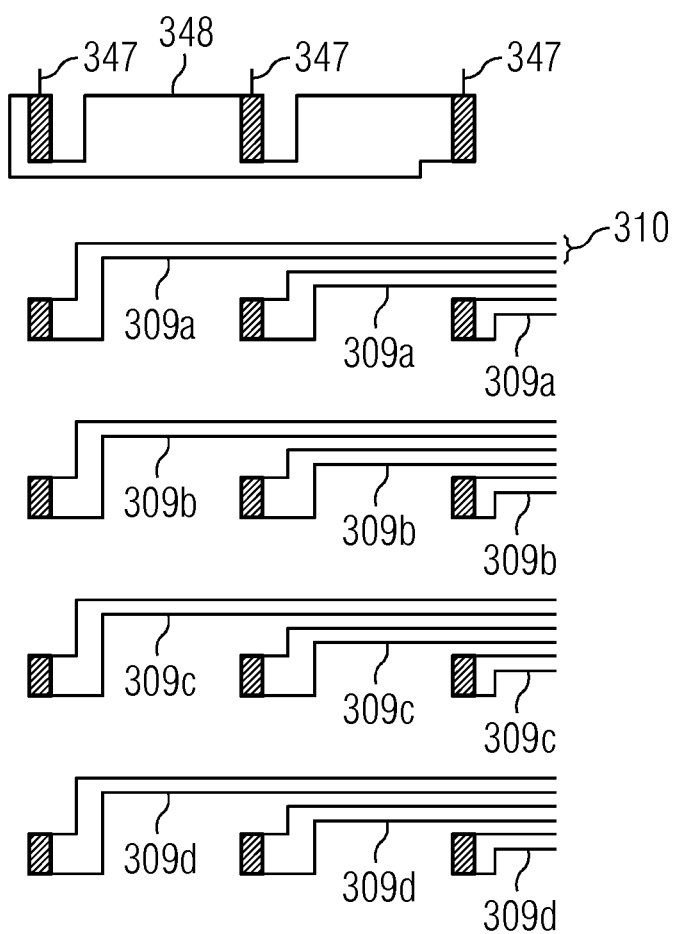
FIG. 3 schematically illustrates an arrangement of secondary wire windings to be connected to a plurality of converters illustrated in FIG. 1 or 2, according to an embodiment.

FIG. 3 schematically illustrates a transformer which may be used for supplying an input AC voltage to in total 12 converters, such as converters 100 or 200 as illustrated in FIGS. 1 and 2, respectively. Thereby an input signal to the transformer may be applied to three input terminals 347 for providing a power signal to a primary winding 348. The primary winding is inductively coupled to twelve secondary windings 309a, 309b, 309c, 309d with I connection, wherein each of the twelve secondary windings 309 provides the input AC voltage to the input terminals 105 and 107, as illustrated in FIG. 1, or to the input terminals 205 and 207, as illustrated in FIG. 2, to the rectifier stage 129 and 229, respectively. Thereby, the three secondary wire windings 309a may provide input voltages having a same phase, wherein the secondary wire windings 309b, 309c, 309d may provide input AC voltages having mutually different phases and also different from the voltage provided by the secondary wire windings 309a.

Figure 4:
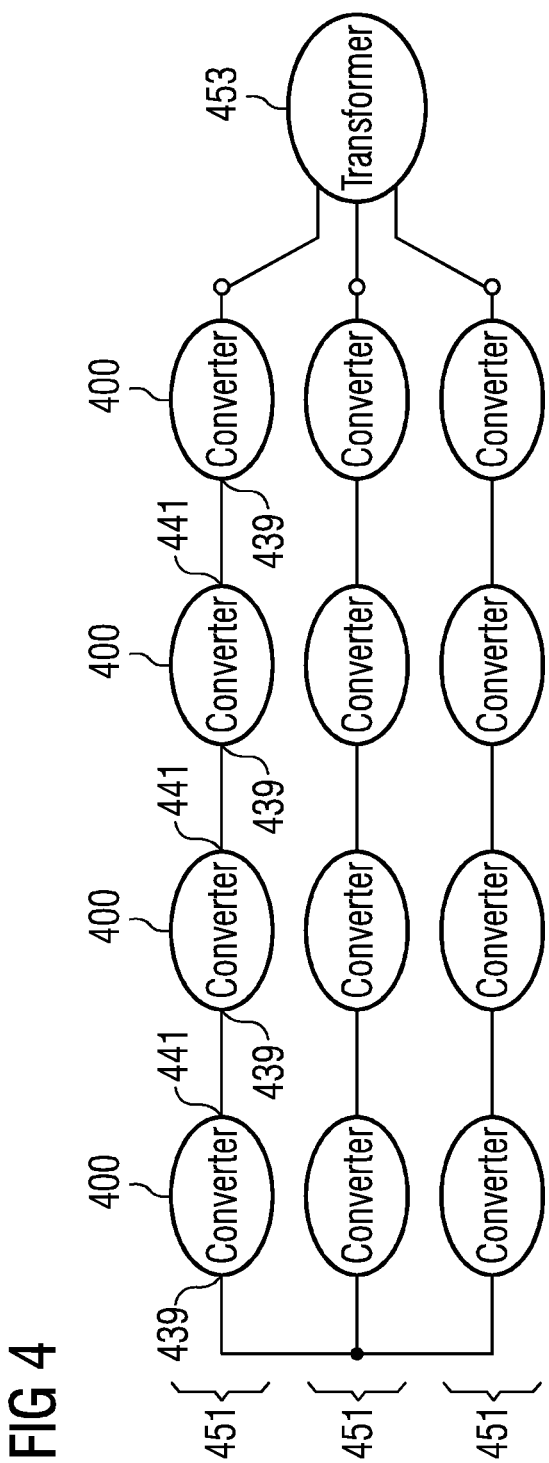
FIG. 4 schematically illustrates an arrangement of assemblies of converters as shown in FIG. 1 or 2, according to an embodiment, for supplying electric energy to a load.

FIG. 4 schematically illustrates an arrangement of three converter assemblies 451, wherein each converter assembly 451 comprises four series connected converters (also referred to as H-cells) 400. Each converter 400 may be adapted as the converter 100 illustrated in FIG. 1 or as the converter 200 illustrated in FIG. 2. In particular, the second output terminal 441 of one converter 400 is connected to the first output terminal 439 of the adjacent converter 400 in order to achieve the series connection. Thereby, the converters 400 are floating regarding an electric potential, such that the arrangement illustrated in FIG. 4 allows a transformation of an input voltage to a higher output voltage. The high output voltage is supplied to a motor 453. The motor may for example be a synchronous motor having a rotational speed corresponding to the frequency of the supply voltage or current signal. In particular, this type multicell converter illustrated in FIG. 4 may primarily be used for induction motors, while for synchronous motors in the 10 megawatt range other converters may be used.

According to an embodiment a converter uses one transformer winding and two connection conductors (105, 107 or 205, 207) for feeding the power from the transformer (103, 203) to the load 453. A converter with 12 cells will need 12 transformer windings and 24 connections, as illustrated in FIG. 3. By adding some components in each converter 400 the transformer may be simplified in a significant degree. Also the connections to each converter (also referred to as H-cell) may be simplified. By using thyristors in the rectifier stage (129, 229), soft pre-charging of the DC capacitors (131, 231) may be performed and in the case of failure the whole cell or converter (100, 200) may be shut down. Each converter (H-cell) can give +900 V, 0 V or −900 V and may be pulse width modulated, to give a variable frequency, variable voltage sine wave output. Since the cells are series connected (compare FIG. 4), the peak phase—N voltage on the motor 453 may be 4×900 V=3.6 kV (or 4.4 kV RMS, phase to phase), to give only exemplary values, without restricting the disclosure to these values.

According to an embodiment the converter requires only a simple transformer, soft start is enabled (using the thyristors) and also cell isolation is enabled in case of failure (using the thyristors).

The embodiment illustrated in FIG. 2 comprises an inductor 228 connecting the second input terminal 207 to the secondary wire winding 209. The inductor 228 may be integrated in the secondary wire winding 209 according to an alternative embodiment.

Referring to FIG. 1, by adding a third "phase" or chopper to the converter stage 133 the input circuit may be changed from 3-phase to single phase. The chopper is pulse width modulated to make the sine wave shaped current input.

Figure 5:
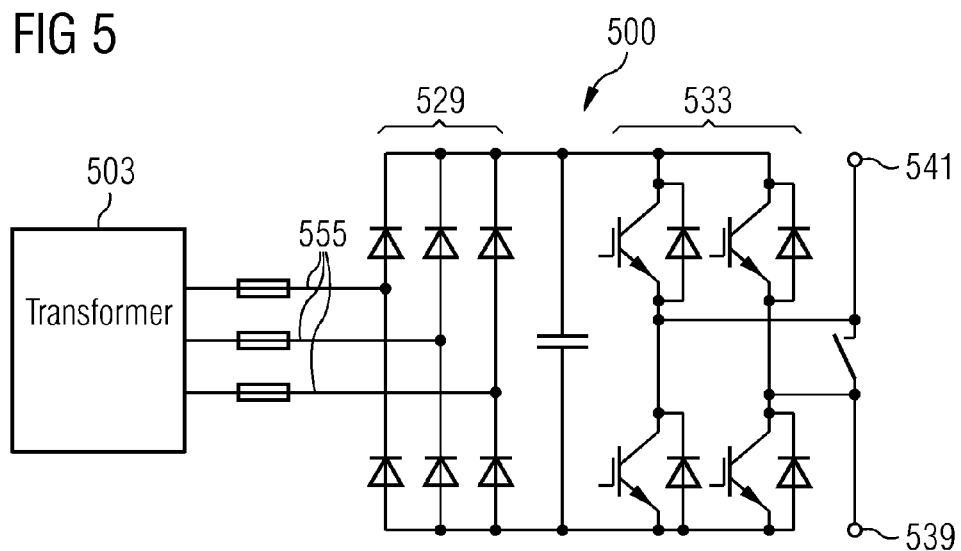
FIG. 5 schematically illustrates a comparative example of a converter.

FIG. 5 schematically illustrates a converter 500 connected to a transformer 503 according to a comparative example. The transformer 503 comprises a three-phase winding arrangement feeding a three-phase diode rectifier 529 comprised in the converter 500. Thereby each converter 500 uses three transformer windings and three connection conductors 555 for feeding the power from the transformer 503 to the load. A converter with 12 cells will need 36 transformer windings and 36 connections. In the comparative example it may be difficult to start up the converter 500, since an additional start-up circuit may be required. The three-phase input requires a complex transformer 503 which may be hard to manufacture. Further, fuses have to clear in case of breakdown in the converter (or diodes).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

What is claimed is:

1. An assembly for converting an assembly input AC voltage to an assembly output AC voltage, the assembly comprising:
   a primary wire winding to which the assembly input AC voltage is applied;
   a plurality of converters, each configured to convert an input AC voltage to an output AC voltage, each converter comprising:
   a rectifier stage, wherein the input AC voltage is applied between a first input terminal and a second input terminal of the rectifier stage;
   a capacitor connected between a first output terminal and a second output terminal of the rectifier stage; and
   a converter stage configured to convert a DC voltage between the first output terminal and the second output terminal of the rectifier stage to the output AC voltage between converter output terminals,
   wherein each rectifier stage is configured to rectify the input AC voltage to the DC voltage, each rectifier stage comprising:
   the first input terminal and the second input terminal between which the input AC voltage is applied;
   a first thyristor;
   a second thyristor connected in series with the first thyristor, wherein the first input terminal is connected between the first thyristor and the second thyristor;
   a first diode;
   a second diode connected in series with the first diode, wherein the second input terminal is connected between the first diode and the second diode; and
   the first output terminal and the second output terminal between which the DC voltage is achieved,
   wherein the first thyristor and the first diode are connected to the first output terminal, and the second thyristor and the second diode are directly or indirectly connected to the second output terminal,
   wherein each of the plurality of converters has a secondary wire winding connected to the first input terminal of the rectifier stage in the converter and the second input terminal of the rectifier stage in the converter, wherein each secondary wire winding is inductively coupled to the primary wire winding,
   wherein the converter output terminals of the plurality of converters are connected in series to achieve the assembly output AC voltage, and
   wherein the thyristors of the rectifier stage in each converter are configured to isolate that converter in response to a failure associated with that converter.

2. The assembly of claim 1, wherein each rectifier stage further comprises a first switchable element connected between the second thyristor and the first output terminal.

3. The assembly of claim 2, wherein each rectifier stage further comprises a second switchable element connected in series with the first switchable element, the series connected first switchable element and second switchable element being connected between the first output terminal and the second output terminal, wherein the second input terminal is connected between the first switchable element and the second switchable element.

4. The assembly of claim 3, wherein, in each rectifier stage, the first diode is connected in parallel to the first switchable element and the second diode is connected in parallel to the second switchable element.

5. The assembly of claim 2, wherein each rectifier stage further comprises a third diode via which the second thyristor and the second diode are indirectly connected to the second output terminal.

6. The assembly of claim 2, wherein each rectifier stage further comprises an inductor via which the second thyristor and the second diode are indirectly connected to the second output terminal.

7. The assembly of claim 6, wherein, in each rectifier stage, the first switchable element is connected to the second thyristor via the inductor.

8. The assembly of claim 1, wherein each rectifier stage further comprises a thyristor control circuit for controlling a conduction state of at least one of the first thyristor and the second thyristor.

9. The assembly of claim 1, wherein each rectifier stage further comprises an inductor connecting the second input terminal to a secondary wire winding.

10. The assembly of claim 1, wherein each rectifier stage comprises a thyristor control circuit for controlling a conduction state of at least one of the first thyristor and the second thyristor,
wherein the thyristor control circuit is configured to perform at least one of the following control functions:
controlling a charging of the capacitor during starting up the converter, and
controlling a shutting off the converter in response to the failure.

11. A converter for use in an assembly for converting an assembly input AC voltage to an assembly output AC voltage, the assembly comprising a primary wire winding to which the assembly input AC voltage is applied, and a plurality of converters including the converter, each of the plurality of converters being configured to convert an input AC voltage to an output AC voltage, wherein the converter comprises:
a rectifier stage, wherein the input AC voltage is applied between a first input terminal and a second input terminal of the rectifier stage;
a capacitor connected between a first output terminal and a second output terminal of the rectifier stage; and
a converter stage configured to convert a DC voltage between the first output terminal and the second output terminal of the rectifier stage to the output AC voltage between converter output terminals,
wherein the rectifier stage is configured to rectify the input AC voltage to the DC voltage, the rectifier stage comprising:
the first input terminal and the second input terminal between which the input AC voltage is applied;
a first thyristor;
a second thyristor connected in series with the first thyristor, wherein the first input terminal is connected between the first thyristor and the second thyristor;
a first diode;
a second diode connected in series with the first diode, wherein the second input terminal is connected between the first diode and the second diode; and
the first output terminal and the second output terminal between which the DC voltage is achieved,
wherein the first thyristor and the first diode are connected to the first output terminal, and the second thyristor and the second diode are directly or indirectly connected to the second output terminal,
a secondary wire winding connected to the first and second input terminals of the rectifier stage, the secondary wire winding being inductively coupled to the primary wire winding,
wherein the converter output terminal of the converter is connected in series with respective output terminals of the other converters in the plurality of converters to achieve the assembly output AC voltage, and
wherein the thyristors of the rectifier stage in the converter are configured to isolate the converter in response to a failure associated with the converter.

12. The converter of claim 11, wherein the rectifier stage further comprises a first switchable element connected between the second thyristor and the first output terminal.

13. The converter of claim 12, wherein the rectifier stage further comprises a second switchable element connected in series with the first switchable element, the series connected first switchable element and second switchable element being connected between the first output terminal and the second output terminal, wherein the second input terminal is connected between the first switchable element and the second switchable element.

14. The converter of claim 13, wherein, in the rectifier stage, the first diode is connected in parallel to the first switchable element and the second diode is connected in parallel to the second switchable element.

15. The converter of claim 12, wherein the rectifier stage further comprises a third diode via which the second thyristor and the second diode are indirectly connected to the second output terminal.

16. The converter of claim 12, wherein the rectifier stage further comprises an inductor via which the second thyristor and the second diode are indirectly connected to the second output terminal.

17. The assembly of claim 16, wherein, in the rectifier stage, the first switchable element is connected to the second thyristor via the inductor.

18. The converter of claim 11, wherein the rectifier stage further comprises a thyristor control circuit for controlling a conduction state of at least one of the first thyristor and the second thyristor.

19. The converter of claim 11, wherein the rectifier stage further comprises an inductor connecting the second input terminal to a secondary wire winding.

20. The converter of claim 11, wherein the rectifier stage comprises a thyristor control circuit for controlling a conduction state of at least one of the first thyristor and the second thyristor,
wherein the thyristor control circuit is configured to perform at least one of the following control functions:
controlling a charging of the capacitor during starting up the converter, and
controlling a shutting off the converter in response to the failure.

* * * * *